3,690,904
CERAMICS PRODUCED FROM SPODUMENE,
PETALITE AND CLAY
Earl G. Spangler, Newport Beach, Calif., assignor to
Lockheed Aircraft Corporation, Burbank, Calif.
Filed Mar. 20, 1970, Ser. No. 21,361
Int. Cl. C04b 33/00
U.S. Cl. 106—39 R                                      7 Claims

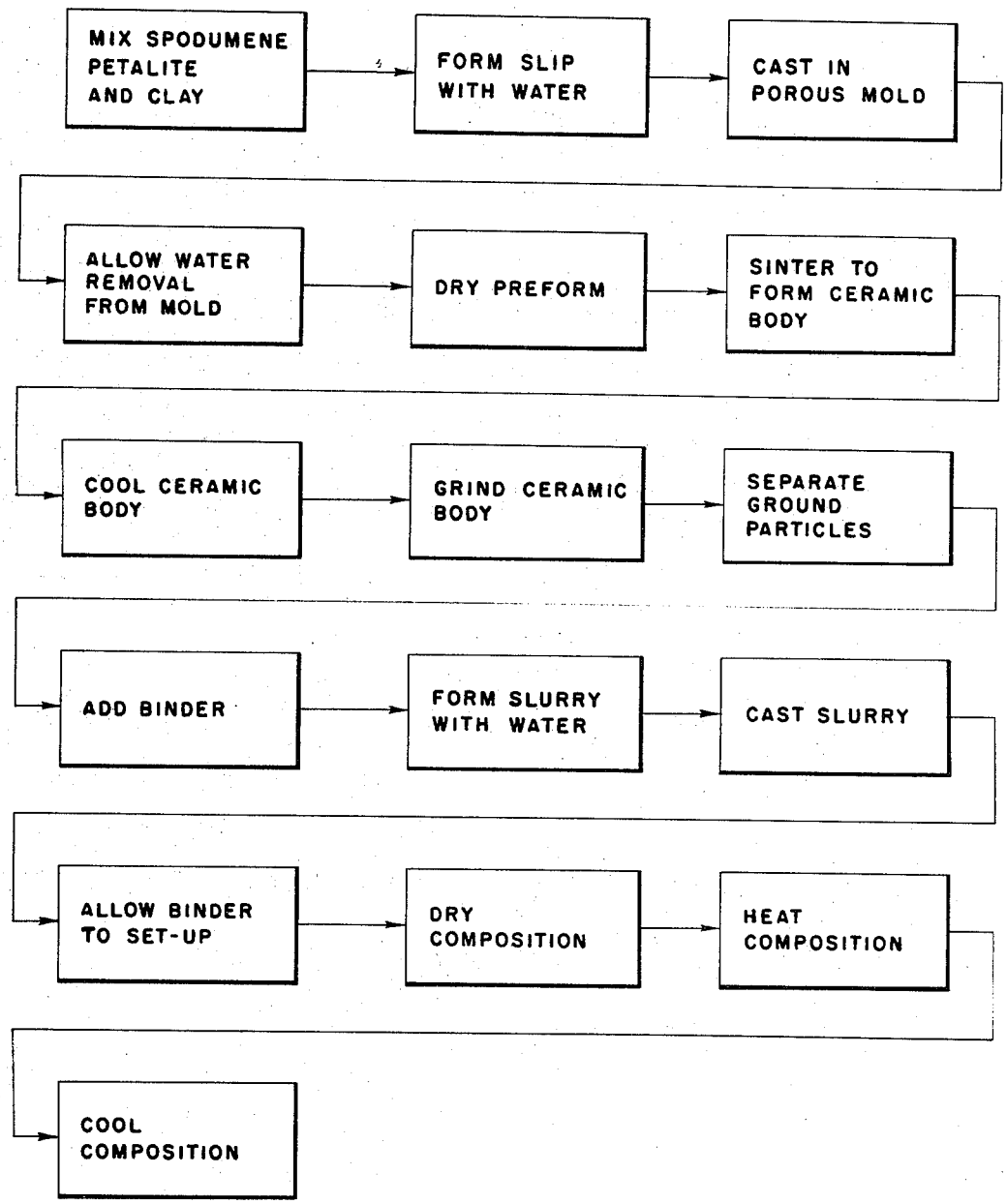

ABSTRACT OF THE DISCLOSURE

A fired ceramic having a nearly zero temperature coefficient of expansion, a hardness of from about 1.0 to 6.75 on the Mohs scale can be formed by firing a composition consisting essentially of at least 10% by weight of the mineral alpha spodumene, at least 10% by weight of petalite and from 10 to 60% by weight of clay.

CROSS-REFERENCES TO RELATED APPLICATIONS

Earl G. Spangler U.S. patent application Ser. No. 738,-205, filed June 19, 1968, entitled "Refractory-Ceramic Composition and Method" now U.S. Pat. No. 3,607,325.

BACKGROUND OF THE INVENTION

Current developments in the aircraft and in other fields have made the desirable development of new and improved dies for use in forming so called "hard to form" metals such as titanium. For many types of forming operations with these metals it is desirable to use ceramic dies which will withstand comparatively high temperatures without cracking or spalling. Preferably any dies of this type should be formed of a material capable of being cast into a desired final configuration. This is because of problems related to the shapes of many such dies.

Various compositions for use in creating such dies have been developed. Many of these compositions are not capable of prolonged use in tooling of the type described without deterioration. Such deterioration frequently manifests itself as cracking or spalling. It may result from a chemical change in the material in such a composition or from such a composition changing in physical form as a result of temperature caused expansion and contraction.

A particularly suitable refractory composition for use in high temperature ceramic dies is disclosed in the copending Spangler U.S. patent application Ser. No. 738,205, filed Jan. 19, 1968, entitled "Refractory-Ceramic Composition and Method." Such a composition includes a calcium aluminate cement used as a binder for fused silica particles. Although suitable for use in cement forming dies compositions as disclosed in this application are regarded as somewhat disadvantageous for use in some applications because of their temperature coefficients of expansion.

This is best explained by referring to the use of a ceramic forming die. Such a die is frequently to be used in accurately forming an article to certain critical dimensions. A die formed of a composition having a significant coefficient of expansion will have different dimensions as it is used at an elevated temperature than it will have when cold. Frequently on heating such a die will tend to change in dimension in a somewhat irregular or nonuniform manner if it is of a complex or intricate shape. Because of these factors in some cases it may be difficult to provide a die which will have close dimensional tolerances for accurate forming operations.

It has of course been recognized that the problem causd by prior ceramic die materials having significant temperature coefficients of expansion could be eliminated by the development of a composition having a zero or nearly zero temperature coefficient of expansion. To be acceptable for die use a ceramic composition or material must also possess a number of other properties and characteristics such as satisfactory strength, resistance to internal composition change and the like. It is considered that no completely suitable ceramic composition having a negligible temperature coefficient of expansion and other properties required in a metal forming die have been developed, although the need for such a composition has been known.

SUMMARY OF THE INVENTION

A broad objective of this invention is to provide new and improved compositions for use in metal forming dies. More specifically the invention is intended to provide ceramic compositions for use in such dies which have nearly a zero temperature coefficient of expansion and other physical properties as are desired in dies for forming metals at elevated temperatures. The use of the term "composition" in describing these objectives of the invention is apt to be somewhat misleading in considering the invention as a whole.

The quest for new and improved die compositions falling within the scope of the present invention lead to the development of what is believed to be a new class of ceramics. Such ceramics are primarily intended to be utilized in metal forming dies, but they are capable of many other different, frequently unrelated uses. Such ceramics are in a technical sense ceramic compositions. To avoid confusion they are described herein as ceramics or ceramic articles or bodies.

As opposed to this the term "ceramic mixture" is used herein to designate a mixture of such ground ceramic particles used as an aggregate and an appropriate binder capable of being formed into an ultimate useable body, such as a die. Such a mixture is again in a technical sense a ceramic composition. It is referred to herein as a ceramic mixture in order to avoid confusion. For the same reason a body or article formed of such a mixture is referred to herein as a ceramic composition, even though such a composition may be held together by a hydraulic binder or by a binder working as an adhesive or in some other manner to physically bond the ceramic aggregate like particles in such a composition.

Another objective in the present invention is to provide new and improved ceramics as this term is used herein. In connection with this objective the invention is intended to provide ceramics having physical properties which are highly advantageous for a variety of different uses. Although individual of these properties may to a degree be already possessed in different ceramics the accumulation or gathering together of all of the different properties hereinafter indicated in a single ceramic is considered to make the ceramics of the present invention particularly desirable for many different uses, including uses in ceramic compositon and mixtures as indicated in this specification.

A somewhat related objective to the invention is to provide a new and improved process for creating ceramics as indicated from raw materials, and in particular raw materials as they are available commercially from mining sources. A further objective of the invention is to provide a process of this type which may be easily and conveniently carried out and which is relatively inexpensive to practice.

A still further objective in the present invention is to provide ceramic mixtures using new ceramics of this invention which may be easily and conveniently formed into various different ceramic composition articles including, but not limited to, metal working dies. Related objectives to the invention are to provide ceramic mixtures which may be handled without difficulty, and which may be sold as stable articles of commerce.

In accordance with this invention a ceramic is created by forming an intimate mixture of spodumene, petalite and clay. Such a mixture is then preferably processed so that the particles within it are placed in direct physical contact with one another, preferably in what may be referred to as a preform configuration. After these particles are located in this manner they are preferably fired or sintered to a temperature of at least 2200° F. and preferably from 2250° F. to 2300° F. so as to form a composition as referred to herein as a ceramic. If the mixture has been placed in a preform corresponding to a final desired article the ceramic resulting from this sintering will correspond to, but will be somewhat different than the shape of the preform and can after be used directly or can be processed prior to use.

A ceramic created in this manner may be ground so as to form particles capable of serving as an aggregate in what is referred to herein as a ceramic composition. Such a composition is created in accordance with this application by mixing these particles with an appropriate binder so as to form what is described herein as a ceramic mixture. The manner in which the mixture is used as well as the physical properties of such a ceramic composition will be dependent upon the nature of the binder used in the mixture.

It is possible to utilize as a binder a hydraulic composition. A preferred hydraulic binder for use in accordance with this invention is a known calcium aluminate cement. When a ceramic mixture falling within the scope of this invention is created using a calcium aluminate cement particularly desirable metal forming dies may be created from such a mixture by adding water, mixing further, casting, curing and then heating. This series of steps will serve to create a ceramic composition having properties enabling such a composition to be used as a metal forming die at an elevated temperature. Articles created in this manner may of course be utilized for other purposes.

Ceramic composition in accordance with this invention can utilize other types of binders which hold the ceramic particles within these compositions in a physical manner. Thus, for example, when a material such as colloidal silica is used as a binder in a ceramic mixture as herein decribed the mixture may be pressed into a desired shape in which essentially physical forces hold the mixture together. An article of this type will not normally be directly used, but will usually be used after being fired so as to bond the individual aggregate particles to one another. Thus, for example, when silica is used as a binder on firing the silica will tend to form a bond with the ceramic particles so as to form a thoroughly unitary article. With the invention such silica is considered to enter into the composition of the ceramic particles by isomorphous replacement as subsequently indicated.

BRIEF DESCRIPTION OF THE DRAWING

The invention is more fully explained in more detail with reference to the accompanying drawing in which:

There is shown a flow diagram indicating the presently preferred steps in creating a ceramic, a ceramic mixture and a ceramic composition in accordance with this invention.

DESCRIPTION OF THE PREFERRED EMBODIMENT

A ceramic in accordance with this invention is, as previously indicated, created from the raw materials spodumene, petalite and clay. The raw material spodumene used should be the mineral expressed by the formula $$Li_2O \cdot Al_2O_3 \cdot 4SiO_2$$

The name spodumene is used herein to designate this particular mineral, and not a related mineral sometimes referred to as triphane as expressed by the formula $$(Li,Na)_2Al_2Si_2O_{12}$$

This clarification is considered necessary because of certain confusion in the appropriate literature as to what in fact is spodumene. The raw material petalite used is a mineral expressed by the formula $Li_2O \cdot Al_2O_3 \cdot 8SiO_2$. The clay used is preferably a commercial clay consisting almost entirely of alumina and silica as either $Al_2O_3 \cdot 2SiO_2$ or $Al_2O_3 \cdot 3SiO_2$.

The proportions of these raw materials which may be used in forming a ceramic of this invention may be varied between comparatively wide limits. The initial mixture of raw materials should contain at least 10 and no more than 90% by weight of spodumene, at least 10 and no more than 90% by weight of petalite and at least 10 and no more than 60% by weight of the clay. The greater the amount of petalite used, the greater the hardness of the ceramic produced. These percentages involve what may be referred to as continuous variable situations. It is considered that ceramics having desired properties are not obtained using more or less ingredients than specified.

They involve extremely wide ranges because of the fact that alumina will enter into isomorphous replacement within chains of $SiO_4$ tetrahedra of a type found in spodumene. It will be recognized that spodumene has a chain type pyroxene structure. With the present invention it is intended to preserve in a ceramic the structure of the spodumene and the petalite and yet to enrich the structure with alumina and silica. Because of the replacement of silicon by aluminum in a silicate chain it is considered impossible to accurately indicate the precise chemical structure which it is intended to obtain in a ceramic of this invention.

For most uses these starting materials should be as free from contaminating organic or inorganic materials as is reasonably possible. This is becaue contaminates may tend to enter into undesired reactions with these raw materials and/or cause the ceramic produced to have an undesired color. One major advantage of the present invention lies in the fact that the raw materials used can be commercial grade as obtained from a mining source. This makes it possible for the present invention to possess a cost advantage. The impurities in such raw materials are, as a general rule, unobjectionable.

It is not to be assumed from the above that the raw materials used with the present invention cannot contain selected impurities or other secondary ingredients. Comparatively small quantities of various contaminates serving as sources for ions such as magnesium, calcium, cobalt, nickel, iron (ferrous) and others known to enter into isomorphous replacement of silica in complex silicates can be present within the starting materials used. Certain of such materials are considered to give ceramics as herein described an appearance making these ceramics valuable as jewelry items.

Small quantities of compounds such as $ZnO_2$ and $Y_2O_3$ may be present in the raw materials in order to provide anion conductors for specialized purposes. It is believed that these particular oxides and others related to them are valuable in enabling the ceramics produced as herein described to glow significantly when these ceramics are heated. The presence of a small amount of iron within the raw materials used may usually be detected by the fact that the sintered ceramics created will have a pink or reddish appearance which will depend upon the amount of iron present.

In order to avoid creation of other than desired compositions in a ceramic as herein indicated it is considered that the total amount of any such secondary ingredient or contaminant compound or ions should be closely limited. It is presently believed that there is significant danger or undesired compound formation occurring if the amount by weight of the raw material mixture used in creating ceramics as described is greater than about 2% of the total weight of the mixture. However, this is considered to involve what may be referred to as continuous variable considerations. Different amounts of different ions can be tolerated depending upon their reactivities. It is believed that in some cases satisfactory compositions outside of this preferred range can be created using up to about 5% by weight of metal ions in the total initial raw material mixture created.

Such secondary or contaminant type ingredients should preferably be present in the form of their oxides. They may however be present in the form of their silicate or their aluminate derivatives. This is because both silica and alumina enter into the ceramic composition created in accordance with this invention, either directly or by isomorphous replacement. From this it will follow that aluminum silicates may be used as such secondary and/or contaminant type ingredients.

As nearly as possible, however, any such secondary or contaminant ingredient should be free from any ions such as potassium and sodium since these ions will tend to attack and break down complex silicates. The secondary or contaminant type of materials used should also be as free as possible from acid radicals other than what may be referred to as silicate and aluminate radicals. This is because such radicals may tend to produce undesired reactions during the formation of a ceramic as herein described. If radicals such as carbonate which break down upon heating are present in the raw material mixture such radicals will tend to lead to the formation of a porous structure because of the escape of gas during the sintering operation employed.

The initial raw material mixture used in creating a ceramic in accordance with this invention may contain small amounts of so called "additives" intended to improve the handling of the mixture of the raw materials and/or to act as a temporary binder to hold the raw material particles together in what may be referred to as a preform or greenware article. Thus, various conventional organic wetting agents such as sulfonates may be used. Further, water soluble polymers such as carboxy methyl cellulose may be employed. Preferably any of such additives should be of a combustible or vaporizable character so that they will burn out of a ceramic as herein described during a sintering or firing operation.

It is considered that the acceptable results can be achieved if such additives are used in an amount of no more than about 2% by weight of the total weight of the initial raw material mixture. If additional amounts are used it is considered that the vaporization or burning out of any such additive may tend to detrimentally effect the strength characteristics of a ceramic article as herein produced.

On occasion it may be desired to form a ceramic as herein described which is of a porous character. An example of this is in the formation of simulated logs which will glow when heated by a gas flame. For economic reasons such articles should be as porous as possible consistant with adequate physical strength for handling so as to minimize the cost of shipping. Porous articles may also be desired for other applications such as when a ceramic of the invention is to be used as an insulating type filler or as a filter.

When it is desired to form a porous ceramic in accordance with this invention the initial raw material mixture created would contain a quantity of combustible particles corresponding to the degree of porosity desired in the final article. Thus, it is desired that the final ceramic should have pores of a particular size or quantity, particles of a combustible corresponding to pore size and pore quantity desired should be used. Such a mixture may also contain other ingredients as indicated which will tend to break down yielding a gas.

The amount of such combustible particles should be just less than the amount which will lower the strength of a final ceramic to an undesirably low point. Thus, this amount will vary depending upon the specific intended application of a final ceramic product. In general an amount of combustible particles no greater than about 50% by weight of all of the other ingredients of a raw mixture as herein described should be used. The particles employed may be particles of materials such as sawdust, woodpulp, polymers such as polyethylene, polyvinyl alcohol or the like which will burn or volatilize without leaving any significant carbon residue during sintering or firing.

In creating a ceramic of this invention the raw materials used are preferably ground as finely as reasonably possible and then are mixed together as indicated in the drawing. If desired the raw materials may be ground together. Inasmuch as essentially solid state reactions are necessary to form a ceramic in accordance with this invention in general the finer the grind of the raw materials and the more intimate the mixture of the materials the more acceptable the product. It is considered that acceptable results—i.e., a completely uniform ceramic—require that the raw materials be ground so as to pass a 50 mesh standard Tyler screen. It is presently preferred, however, that the raw materials used by at least —200 mesh (standard Tyler screen) in size in order to obtain a completely uniform product.

After a mixture as indicated has been formed it is considered necessary to place the raw materials in a physical form or body in which lithium will not readily be volatilized during firing or sintering and to place the raw materials in a physical form or body in which the particles of these materials are located as close to one another as reasonably possible. It will be recognized that the latter pertains to getting the raw ingredients in positions in which desired solid state reactions will occur as easily as possible. A suitable form for the raw materials may be achieved in various known manners such as by pressing the raw material mixture into pellets.

It is preferred, however, to place the raw materials in a suitable form or body for firing or sintering using a procedure such as is commonly used in slip casting many different ceramics. As indicated in the drawing this is accomplished by forming a slip by the addition of water to the raw material mixture. The water used should be preferably distilled or deionized water so as to avoid the addition of unwanted contaminants. Conventional mixing equipment or a ball mill or the like may be used to form this slip. In general only sufficient water should be added to form a thick, flowable slip more or less resembling a thick mud suspension capable of being cast. From this it will be apparent that the amount of water added is not critical. In general as little water should be used as reasonably possible so as to minimize subsequent water removal time.

In accordance with the preferred manner of creating a ceramic of this invention a slip as described it cast into a porous mold such as a mold commonly used in production of so called "greenware." As such a mold is filled water will be withdrawn from the cast material through the walls of the mold so as to create what may be referred to as a greenware article or preform capable of being removed from the mold and of being handled to a limited extent. The amount of time required to create such as greenware article or preform will depend upon the mold and other related factors.

When a ceramic is being created in accordance with this invention the mold used may be of any convenient size and dimension to create a preform or greenware article capable of being easily handled and subsequently sintered or fired. A mold used, however, may correspond to the shape of a final article desired when a ceramic object or article is being produced. While such a mold must correspond to the shape of such an article it must be different from the shape of the article since some shrinkage will take place during the subsequent firing or sintering step. By appropriate mold design it is possible to produce ceramic articles or bodies capable of being directly used after sintering or firing as various types of vessels, molds, metal working tools and the like. Mantle structures for use with various types of hydrocarbon fueled lights may even be created directly in this manner.

After a preform or greenware article has been created as described it is of course removed from the mold. Then it is preferably air dried for a sufficient time and at a sufficient temperature to remove any remaining intrained water in the preform or greenware article. This may be conveniently accomplished by air drying for a long period at room temperature or by air drying in an oven at a temperature of from about 200° F. to 250° F. for a sufficient period, usually overnight, to remove water. The objective of this step is to get rid of any water which might suddenly volatilize by turning to steam so as to tend to disrupt or break up the structure of the preform or greenware article during the next step.

The next step is, as indicated in the drawing, to fire or sinter so as to create the desired ceramic composition. This may be accomplished in any convenient type of kiln. Preferably an electric kiln is used for the purpose because of convenience of use. The preform or greenware article should preferably be brought up to a temperature of at least 2200° F. and preferably from 2250° F. to 2300° F. at a relatively gradual rate so as to avoid thermo shock which might tend to break up the body being fired. Higher temperature can be used but the use of such temperature is considered uneconomic. The preform or greenware article fired should preferably not be heated to a temperature at which it will start to flow in the kiln in order to facilitate subsequent removal of such an article from the kiln.

Because of the nature of the solid state reactions which occur during the firing it is difficult to state a precise firing time required in order to form a desired ceramic which is applicable to all particles. During the sintering or firing a greenware article as described will shrink roughly about 10% in lineal dimension. It is considered that the firing should be continued at least until all of such shrinkage has occured. This is because such shrinkage is taken as being indicative that the desired solid state reactions occurring during sintering or firing have in fact occurred.

However, to avoid questions as to this it is considered that an article sintered should be held at the sintering or firing temperature at least a half hour and preferably an hour after all evidence of shrinkage has ceased. This additional time is considered to insure that the raw materials have been fully reacted. It is also considered necessary in order to make sure that the structure of a ceramic created in this manner is stabilized and made relatively uniform by such mechanisms as isomorphous replacement and diffusion.

Normally the sintering and firing in creating a ceramic of this invention will be carried out in a conventional kiln in air. However, if desired this particular step may be carried out in a vacuum. If this is done it is considered that the optical properties in the resultant product are changed so that the product is more transparent than if it was fired by air. For most applications this is not significant. However, it is considered significant if the ceramic produced is to be utilized in a decorative manner such as in a jewelry type application. For such applications it may be desirable to heat the article created during sintering to the point where it will flow.

Following the sintering or firing the ceramic article produced is cooled. The manner in which such cooling may be carried out is considered significant in indicating the fact that a ceramic as herein described is different from prior known related compositions. A ceramic article as produced as described need not be slowly cooled, but can be taken directly from a kiln and can be air quenched or quenched in water.

This illustrates that ceramics as herein described can withstand significant heat shock. These ceramics will normally have a temperature coefficient of expansion within the range of $-0.3 \times 10^{-6}$ to $-0.01 \times 10^{-6}$. The reasons for this differential or range in expansion coefficients are not precisely known, but are considered to relate to minor variations in the chemical character of a ceramic produced as indicated. It is considered significant that ceramics as herein described have temperature coefficients of expansion within this comparatively narrow range even though considerable latitude is permissible within the mixture of raw materials used in creating these ceramics.

Ceramics created in the manner described will also normally range in hardness from within 1.0 to about 6.75 on the Mohs scale. The particular hardness obtained will normally be related to the composition of the raw material mixture and to the compactness or intimacy of the particles of a greenware article or preform created. In general the finer the particles used and the more closely they are compacted together the harder the ceramic produced. Such ceramics have a softening curve similar to the softening curve of fused silica. For certain applications this is advantageous.

Ceramics produced in this manner have other unique characteristics. When heated by a flame such as is found in a gasoline lantern or created by a related burner these ceramics tend to glow, normally with a pure white color. It is considered that this color can be changed by the addition of secondary or contaminant type ions of types indicated in the discussion in this specification pertaining to the mixture of raw materials employed in creating a ceramic.

The fact that the ceramics described are unique can also be demonstrated in another way. Normally they will withstand the temperature created by a simple acetylene and air flame as created by common torches. When heated to a high temperature as with an oxyacetylene flame they will tend to bubble and act much like a metal approaching its welding temperature. This would indicate that in all probability techniques can be developed so that these ceramics can be welded.

The grindability of ceramics created as described also indicates the unique characteristics of these materials. When they are applied to a common abrasive grinding wheel they are not ground in the normal manner but tend to form a surface which can best be described as a "slick" polished surface which more or less resembles the surface on a piece of polished soap stone. Yet they can be ground with a course grinding wheel. Such a wheel apparently exercises a gouging type of grinding action. These ceramics can be ground using hammer and related mills (including ball mills) which apply a force in a manner similar to the manner in which force is applied with a hammer. When ground in this manner they tend to shatter. It should be noted that pieces of a ceramic as herein indicated have withstood prolonged grinding in a ball mill without being reduced to fine particles. Such pieces after such treatment had a polished, smooth appearance more or less resembling the appearance of a piece of polished soap stone.

Because of the complex character of silicate chemistry and the fact that stoichiometric formulas means little in this field it is difficult to determine the precise chemical nature of ceramics created as herein described. These ceramics are considered to be pyroxenes in which there is indefinite linking of $SiO_4$ tetrahedra by the oxygen atoms at the apices of the tetrahedra into extended chains in which aluminum has isomorphously replaced silicon and in which lithium is held interstitially in substantially the manner in which it is held in spodumene and petalite.

These chains are considered to be larger or longer than the chains in the minerals spodumene and petalite and to have a structure which is substantially the same as the structure of spodumene and petalite except for this length factor. It is considered that these chains are interconnected in some presently unexplained manner. The existence of such an interconnection is considered to be evidenced by the fact that all of the characteristics of the ceramics of this invention have not been duplicated by creating other related ceramics from spodumene and clay alone or from petalite and clay alone using a procedure as herein set forth.

Lower properties of any of the ingredients of a ceramic of this invention than are indicated in the preceding are considering to also involve a loss of characteristics such as high temperature utility or hardness in ceramics of this invention. It will be recognized that such characteristics are obtained in the ceramics of this invention by means of factors which can be regarded as continuous variables. Thus, there is no sharp cut off of desired properties at exactly the proportions indicated.

If a ceramic article or body created as described has been created so as to have a desired ultimate configuration for use it may be directly employed for such use after firing and cooling operations as indicated. When such a ceramic is to be utilized in what is referred to herein as a ceramic mixture for use in creating a ceramic composition as defined herein the ceramic to be utilized in a "reformed" ceramic itself must be ground. Equipment of the type indicated in the proceeding may be satisfactorily employed for this purpose. The product resulting from grinding using a hammer mill or the like will normally consist of particles broken along relatively sharp planes. Thus, this product will tend to have the general characteristics of a piece of glass which has been shattered by a direct sharp blow.

The amount to which ceramics should be ground for use in a ceramic mixture a "reformed" ceramic is of course depended upon the nature of the fired ceramic composition to be produced and the manner which it is to be used. For the preferred utilization of a ceramic mixture as herein defined in creating heated metal forming dies it is preferred to utilize particles of different sizes as described in the aforenoted copending Spangler application entitled "Refractory-Ceramic Composition and Method." In order to avoid repetition of disclosures the entire disclosure of this copending application is incorporated herein by reference.

For die-like use a ceramic as noted should be ground as indicated in the drawing and then separated into sized particles. In a preferred ceramic mixture as herein described from about 40 to about 80% by weight of the particles used should be from a −4 to +12 mesh standard Tyler screen size, from about 0 to 30% by weight of these particles should be from a −12 to a +32 mesh standard Tyler screen size and from about 20 to 60% by weight of these particles should be from −32 to a +200 mesh standard Tyler screen size.

Particles within this range of sizes as obtained by hammer mill or related grinding are considered preferably inasmuch as they effectively interlock and compact to obtain a comparatively dense, strong structure in which a significant amount of strength, is derived from particle to particle reinforcement and interlocking as pointed out in the aforesaid Spangler application entitled, "Refractory-Ceramic Composition and Method." This is quite important in obtaining desired physical strengths in what are defined herein as ceramic compositons. These ultimate strengths are achieved through the use of a binder in a ceramic mixture which will tend to hold the individual particles together or by creating a "reformed" ceramic.

Such a reformed ceramic may be created by forming a slip of ground ceramic particles, casting such a slip into a porous mold such as a plaster mold so as to create what may again be referred to as a preform, removing such a preform from the mold used and then refiring or resintering the resultant article at a temperature and for a time as used in creating the ceramic used as a source of the ground particles employed in creating such a reformed ceramic article.

Reformed ceramic articles of this type can be created using a mixture of particles as indicated in the preceding discussion. It is also, however, possible to utilize finer particles in creating such a reformed ceramic. Normally such a ceramic is created by milling as in a ball mill relatively course particles with water so as to form a slip. If desired various secondary agents such as conventional wetting agents may be present in such a mill to facilitate the formation of such a slip. Because of the nature of this method of forming a slip normally the precise sizes of the particles used in it will not be known.

A slip of these ground ceramic particles may be cast into a porous mold in the same manner in which any other ceramic composition may be cast into such mold. The cast slip of this type is preferably left in the mold until the liquid vehicle of the slip is substantially exhausted through the mold walls so that a preform or greenware type of article is created. Such an article is preferably air dried as described in connection with the preform or greenware articles created from the raw materials used in making the ceramic. Then it is preferably fired to the same temperature as is used in creating this ceramic and held at such a temperature for a period of at least a half hour and preferably an hour so as to allow the particles to join together. They are considered to join together in this process by the same mechanism which are involved in stabilizing the structure of the ceramic created from the raw materials.

This process of making reformed ceramic articles is considered to indicate the unique character of the ceramics of this invention. During the process the particles in the cast slip will very accurately conform to the dimensions of the cast mold used. Thus, the preform created will be an accurate reproduction of the mold employed. Further after firing such a reform ceramic will still accurately conform to the dimensions of such a porous mold. The absence of noticeable shrinkage in forming such a reformed article is considered quite significant.

A ceramic mixture as described can be created by blending and mixing the particles used with a binder. In general from about 15 to about 30% by weight of a complete ceramic mixture should consist of a suitable binder and the balance should consist of particles as described for die use. If less binder than indicated is used an ultimate ceramic composition created will tend to have undesirably low strengths. If on the other hand an excess over the amount of binder indicated is used there is danger of binder being wasted and of the mere physical presence of the binder tending to block the individual ceramic particles from interlocking and fitting together so as to reinforce one another.

A particularly suitable, preferred binder for use in a ceramic mixture of this kind is common aluminous cement. Typical cements of this type are primarily mixtures of monocalcium aluminate, $CaO \cdot Al_2O_3$, subcalcium aluminates, $CaO \cdot 2Al_2O_3$, and percalcium aluminate, $$12CaO \cdot 7Al_2O_3$$

Such cements normally contain minor quantities of other compounds including conventional portland cement type compounds. In general the composition of such aluminous cement will vary depending upon raw materials used in creating them, manufacturing conditions employed in their manufacture and other related factors.

It is not considered necessary to describe aluminous cements in further detail since they are well-known and are sold commercially. One reference indicating the character of these aluminous cements is the text by Czernin entitled, Cement Chemistry and Physics for Civil Engineers, published in 1962 by the Chemical Publishing Co., New York, N.Y. It is to be understood, however, that other hydraulic cements other than aluminous cements may be used. Aluminous cements as described in this text are considered to be particularly desirable because of their high temperature characteristics are valuable in metal forming dies.

These characteristics or properties may be obtained from a ceramic mixtures as described by mixing this mixture with about 10% by weight water, this 10% figure being calculated on the basis of the weight of the dry ingredients in the ceramic mixture. After thorough mixing the resulted ceramic slurry can be cast into an appropriate mold such as a mold having a desired die shape and then compacted as by vibration. Normally the mold filled in this manner will be allowed to set for a period of 24 hours at a room temperature of about 70° F. to 90° F. until the hydraulic properties of the ceramic cause the cast body to be set up.

After this resultant product is air dried at an ambient temperature or slightly above room temperature for a period of at least 24 hours or preferably longer in order to remove any water which is not chemically combined. Shorter periods can, of course, be used if temperatures in the range of 200° F. to 250° F. are employed. When temperature resistance is not a factor such a dried composition can be used directly.

Thereafter, such a dried article can be heated gradually such as at a rate of 50° F. per hour until it has reached the temperature of 500° F. after this the so heated article may be raised in temperature at the rate of about 300° F. per hour until it has reached the temperature of about 1850° F. Then the resultant article may be cooled. After this it is ready for use. Such an article is referred to herein as a ceramic composition. Normally the mold used in forming such a ceramic composition will have a shape corresponding to the shape for metal forming so that the article created in this manner may be directly used as a forming die.

It is possible to utilize within a ceramic mixture as herein described other than a hydraulic binder. Such a binder may be an inorganic material such as talc, a colloidal silica composition or the like or a mixture of such materials. Such binders should preferably be used in approximately the same proportions as hydraulic cement binders can be used in a mixture as herein described. When such binders are used a final ceramic composition such as a composition shaped as a metal forming die can be created by pressing a ceramic mixture containing such a binder to a desired shape and then firing.

A body created in this manner can be heated gradually such as the rate of 300° F. per hour up to a temperature to slightly above the temperature at which the resultant body is to be used, but not to exceed 2300° F. At such temperatures silica contained in inorganic binders of the type herein described will tend to react with the ceramic particles present so as to form a completely unitary type structure. The nature of such reactions are not completely understood, but they are considered to involve the taking up of silica into the basic chemical structure of the material in the ceramic particles. This, of course, contributes materially to a die produced in this manner having a high degree of structural strength. It is considered to also create a structure in which there is no danger of detrimental dimensional changes resulting from silica changing in crystalline form.

An extremely important facet in the present invention relates to the fact that the temperature coefficient to the expansion of a ceramic composition as defined can be regulated or controlled to very nearly approximate 0 by the choice of the binder utilized and by regulation or variation of the quantity of the binder employed. Binders as described when used in the amounts indicated produce final ceramic compositions which are considered to be particularly desirable in this regard.

In order to facilitate an understanding of this invention the following specific example is given. It is to be understood that this example is given for this purpose only, and that other examples of a related nature could be given to facilitate an understanding of the invention.

EXAMPLE

A mixture was prepared of 20% by weight —200 mesh spodumene, 40% by weight —200 mesh petalite and 40% by weight —200 mesh clay (ball clay) in a common ball mill. After these ingredients had been mixed sufficient distilled water was added to form a thick clay slip. After this slip was created it was cast into a ¾" x 4" plaster mold having an excess slip sprue type entrance to the mold. An excess of the slip was placed in this entrance so that the mold would become completely filled as water was moved from the slip within the mold out through the walls of it. The mold was then allowed to sit for 4 hours at 72° F.

After this the resultant preform or greenware type article was removed from the mold and air dried at 250° F. over night. The dried preform was then placed in a kiln and the kiln was gradually brought up to a temperature of between about 2250° F. and 2300° F. at a rate of about 100° F. per hour and then held at such a temperature for at least 1½ hours. The resultant article or ceramic was then removed from the kiln and quenched in a container of water.

This ceramic article was then ground using an impact type grinder such as a hammer mill. The resultant particles were then separated on a series of standard Tyler screens. From the separation obtained in this manner a blended mixture was prepared of 20% by weight —200 mesh calcium aluminate cement, 40% by weight particles from —4 to +12 mesh size, 10% particles of from —12 to +32 mesh size and 30% by weight —32 and +200 mesh ground particles. After this mixture was created it was mixed with about 10% of its weight of water so as to create a cement slurry.

This slurry was then cast into a mold corresponding to the shape of a metal forming die and held at a constant humidity to prevent water loss for a period of 24 hours. The resultant concrete line article was then removed from the mold and heated at about a 100° F. for a period of 24 hours. Then this article was gradually heated further at a rate of about 50° F. per hour until its temperature reached 500° F. Next the temperature of the article was gradually raised at a rate of about 300° F. per hour until a temperature of 1850° F. was obtained. Then the article produced in this manner was air cooled to room temperature. This article was then ready fo use in metal forming.

I claim:

1. A fired ceramic prepared by firing a composition consisting essentially of mineral alpha spodumene, petalite and clay, said composition containing at least 10% by weight of the mineral alpha spodumene, at least 10% by weight petalite and from 10 to 60% by weight clay at a temperature of at least 2,200° F. said ceramic having a coefficient of expansion within the range of from about $-0.3 \times 10^6$ to about $-0.1 \times 10^6$, a hardness of from about 1.0 to about 6.75 on the Mohs scale, being capable of glowing when heated, being capable of being shattered by a blow and being capable of being polished by an abrasive.

2. A ceramic article which comprises: ground particles of a fired ceramic initially prepared by firing a composition consisting essentially of mineral alpha spodumene, petalite and clay, said composition containing at least 10% by weight of the mineral alpha spodumene, at least 10% by weight petalite and from 10 to 60% by weight clay at a temperature of at least 2,200° F. said ceramic having a temperature coefficient of expansion within the range of from about $-0.3 \times 10^6$ to about $-0.1 \times 10^6$, a hardness of from about 1.0 to about 6.75 on the Mohs scale, being capable of glowing when heated, being capable of being shattered by a blow and being capable of being polished by an abrasive, said particles being bonded to one another.

3. A ceramic article as claimed in claim 2 in which:
said particles consists of broken pieces of different sizes, having relatively sharp planar surfaces, said pieces interlocking with one another so as to contribute strength to said article,
from about 40 to 80% by weight of said particles are from a —4 to a +12 mesh standard Tyler screen size, from about 0 to 30% by weight of said particles are from a —12 to a +32 mesh standard Tyler screen size and from about 20 to 60% by weight of said particles are from a —32 to a +200 mesh standard Tyler screen size.

4. A ceramic article as defined in claim 3 in which:
from about 40 to 80% by weight of said particles are from a —4 to a +12 mesh standard Tyler screen size, from about 0 to 30% by weight of said particles are from a —12 to a +32 mesh standard Tyler screen size and from about 20 to 60% by weight of said particles are from a —32 to a +200 mesh standard Tyler screen size.

5. A ceramic article as claimed in claim 2 wherein:
said particles within said body are directly bonded to one another by the material within said particles.

6. A ceramic article as claimed in claim 2 including:
a calcium aluminated cement bonding said particles to one another, said cement constituting from about 15 to about 30% by weight of said article.

7. A ceramic article as claimed in claim 2 including:
silica, said silica serving to bond said particles together by entering the chemical structure of said particles, said silica being present in an amount of from about 15 to 30% by weight of said article.

References Cited
UNITED STATES PATENTS

| | | | |
|---|---|---|---|
| 2,159,349 | 5/1939 | Bennett | 106—45 |
| 2,662,028 | 12/1953 | Fenton | 106—45 X |
| 3,096,159 | 7/1963 | Van Cott | 106—65 X |
| 3,228,779 | 1/1966 | Van der Beck | 106—65 |
| 3,379,543 | 4/1968 | Norwalk | 106—39 R |
| 3,380,838 | 4/1968 | Sack | 106—39 R |
| 3,557,575 | 1/1971 | Beall | 106—39 DV |

OTHER REFERENCES

Ceramic Industry Magazine; Chicago, Ill., January 1967 (Petalite), p. 129 plus (Spodumene), p. 145.

TOBIAS E. LEVOW, Primary Examiner

W. R. SATTERFIELD, Assistant Examiner

U.S. Cl. X.R.

106—67, 71, 104